US012668130B2

(12) United States Patent
Li et al.

(10) Patent No.: US 12,668,130 B2
(45) Date of Patent: Jun. 30, 2026

(54) DETERMINATION OF PREFERRED INFORMATION COMMUNICATION VARIANTS IN VEHICLES

(71) Applicant: TOYOTA MOTOR NORTH AMERICA, INC., Plano, TX (US)

(72) Inventors: Paul Li, Plano, TX (US); M. Idris Stallworth, Plano, TX (US); Hitesh Alimchandani, Plano, TX (US); Doug Coleman, Plano, TX (US)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/648,817

(22) Filed: Apr. 29, 2024

(65) Prior Publication Data

US 2025/0332921 A1 Oct. 30, 2025

(51) Int. Cl.
B60K 35/85 (2024.01)
B60K 35/10 (2024.01)
(Continued)

(52) U.S. Cl.
CPC .............. B60K 35/85 (2024.01); B60K 35/10 (2024.01); B60K 35/22 (2024.01); *B60K 35/20* (2024.01); *B60K 35/23* (2024.01); *B60K 2360/1438* (2024.01); *B60K 2360/151* (2024.01); *B60K 2360/166* (2024.01); *B60K 2360/169* (2024.01); *B60K 2360/182* (2024.01);
(Continued)

(58) Field of Classification Search
CPC ........ B60K 35/85; B60K 35/10; B60K 35/22;

B60K 35/23; B60K 2360/1438; B60K 2360/151; B60K 2360/166; B60K 2360/169; B60K 2360/592; B60K 2360/182; B60K 2360/731; B60K 2360/741; B60K 35/20; B60W 50/14; B60W 2050/143; B60W 2050/146; B60W 2540/047; B60W 2540/215; B60W 2540/225

See application file for complete search history.

(56) References Cited

U.S. PATENT DOCUMENTS 9,727,996 B2      8/2017 Pandey et al.
2016/0349969 A1*  12/2016 Tallamy .................. G06F 9/451
2023/0393867 A1*  12/2023 Penilla ................ H01M 10/425

FOREIGN PATENT DOCUMENTS

CN            109463004 B      7/2023
WO      WO 2022/019607 A1     1/2022
WO      WO 2022/218700 A1     10/2022

* cited by examiner

*Primary Examiner* — Douglas Wilson
(74) *Attorney, Agent, or Firm* — HAYNES AND BOONE, LLP

(57) ABSTRACT

Different information communication variants (e.g., icon size or arrangement) are selected for use in the in-cabin displays and other user interaction mechanisms. As users adjust and interact with the in-cabin interaction mechanisms, those adjustments and interactions are collected. These user interface data, charging behaviors, etc. are then analyzed and used to determine preferred information communication variants. The vehicle cockpit becomes a personal testing laboratory on wheels that aims to understand the driver and produce the best-in-class cockpit experience for drivers/users.

20 Claims, 7 Drawing Sheets

(51) Int. Cl.
    *B60K 35/20*          (2024.01)
    *B60K 35/22*          (2024.01)
    *B60W 50/14*          (2020.01)
    *B60K 35/23*            (2024.01)

(52) U.S. Cl.
    CPC .. *B60K 2360/592* (2024.01); *B60K 2360/731*
        (2024.01); *B60K 2360/741* (2024.01); *B60W*
        *50/14* (2013.01); *B60W 2050/143* (2013.01);
        *B60W 2050/146* (2013.01); *B60W 2540/047*
        (2020.02); *B60W 2540/215* (2020.02); *B60W*
        *2540/225* (2020.02)

500

502
Display information communication variants to vehicle user

504
Receiving interaction data related to user interactions with information communication variants 506
Determining a preferred information communication variant 508
Transmitting the preferred information communication variant to target vehicle

600

650

Processor Circuit

660

Processor

664

Memory

666

Instructions

668

Communication Module

DETERMINATION OF PREFERRED INFORMATION COMMUNICATION VARIANTS IN VEHICLES

TECHNICAL FIELD

The subject matter described herein relates generally to information communication in vehicles and, more particularly, to systems and methods for determining preferred information communication variants in vehicles.

BACKGROUND

Electric vehicles ("EVs") may display a charge status of the vehicle battery, a vehicle range, a charge required notification, or various other information about the EV. Such information may be displayed on various screens or systems around the EV, such as on a central infotainment system, a gauge cluster, or a heads-up display ("HUD"). Such information may also be communicated via an audible reminder.

Despite the display or other communication of such notifications, vehicle occupants seldom act on the prompts. As a result, the occupants are put in unnecessary risk of being stranded or otherwise endangered.

SUMMARY

The various embodiments described herein provide a solution to obtain action, in response to communication prompts, more effectively on the part of vehicle occupants. A general embodiment of the present disclosure provides a system to determine preferred information communication variants in vehicles. Such a system includes one or more user interaction mechanisms positioned in a vehicle cabin. A processor is coupled to the interaction mechanism to perform operations comprising: causing a plurality of information communication variants to be communicated to one or more vehicles, the information communication variants being displayed to a plurality of users within the vehicles; receiving, via the user interaction mechanisms, interaction data related to user interactions with the information communication variants; determining, based on the user interaction data, a preferred information communication variant among the information communication variants; and causing the preferred information communication variant to be transmitted to one or more target vehicles in response to determining the preferred information communication variant.

An alternative general embodiment of the present disclosure provides a computer-implemented method to determine preferred information communication variants in vehicles. Such a method includes causing a plurality of information communication variants to be communicated to one or more vehicles, the information communication variants being displayed to a plurality of users within the vehicles; receiving, via a user interaction mechanisms, interaction data related to user interactions with the information communication variants; determining, based on the user interaction data, a preferred information communication variant among the information communication variants; and causing the preferred information communication variant to be transmitted to one or more target vehicles in response to determining the preferred information communication variant.

In yet another embodiment, a computer-implemented method for determining preferred information communication variants in vehicles. Such a methods includes communicating a plurality of information communication variants to one or more vehicles; receiving interaction data related to user interactions with the information communication variants; and determining a preferred information communication variant among the information communication variants.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the system described herein, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
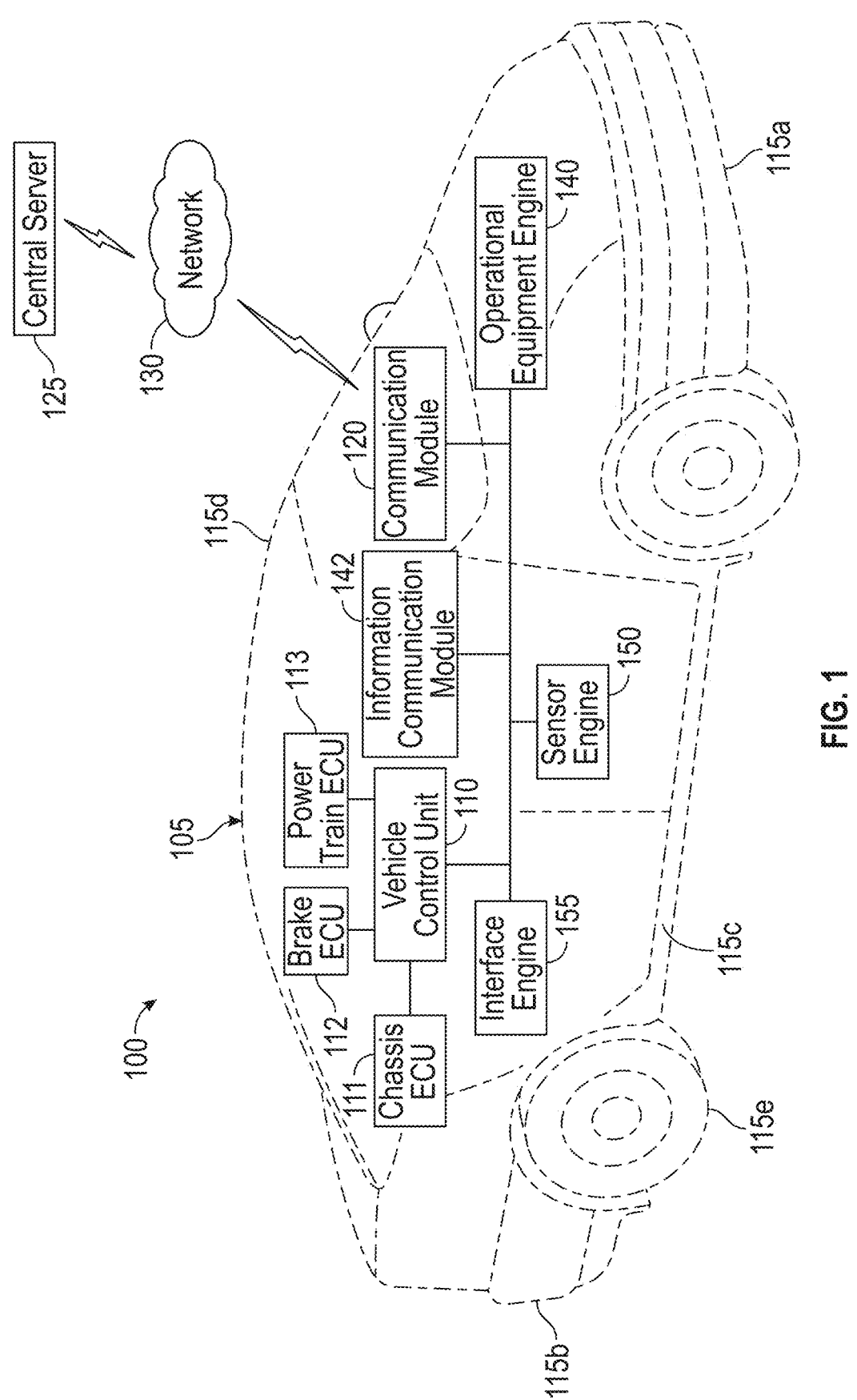
FIG. 1 is a diagrammatic illustration of a system for determining preferred information communication variants in accordance with at least one embodiment of the present disclosure.

The present disclosure is generally directed to determining preferred information communication variants (e.g., in-cabin displays) in vehicles. As previously discussed, EV range estimation and charging notifications are communicated to vehicle occupants, but seldom acted upon. Range accuracy is concerning, and range display varies across manufacturers. However, the EV cockpit has the potential to provide an experimental modifiable space where drivers can select from a few curated menus of variants. From the auto manufacturer side, this observational information can be used to understand driver usage and perception regarding how vehicle range is best displayed collectively for their respective vehicle types. Such features can be coupled with actionable reminders for a more positive EV experience and peace of mind for the driver regarding range and routine charging.

Illustrative embodiments of the present disclosure aim to understand vehicle occupant preferences and their natural-istic interaction with in-cabin displays to tailor better attractive, timely, and easy information interventions/communication variants (e.g., presentations, icon arrangement/shape/size, sounds, lights). Using A/B testing methodologies (or some other suitable testing methodology), different communication variants are selected for use in the in-cabin displays and other user interaction mechanisms. As users adjust and interact with the in-cabin interaction mechanisms, those adjustments and interactions are saved by the system and collected (e.g., in the cloud). Eye-tracking data and charging routings are also used to assess interface engagement. These user interface preferences, charging behaviors, etc. are then transmitted over the network and used by analysis teams (e.g., human factors, user experience teams, etc) for backend analytics and improvements for future software updates. Overall, the vehicle cockpit becomes a personal testing laboratory on wheels that aims to understand the driver and produce the best-in-class cockpit experience for drivers/users.

A/B testing is a methodology in user experience research, but it has yet to be used in a vehicle setting. A/B tests consist of a randomized experiment involving at least two variants (hence the letters 'A' and 'B'). It can include application of statistical hypothesis testing or "two-sample hypothesis testing," as used in the field of statistics. A/B testing is a way to compare multiple versions of variables, for example, by testing a subject's response to variant A against variant B, and determining which of the variants is more effective.

With various display interface arrangements and communication methods across EV makes, range info and state-of-charge ("SOC") can confuse how and where they are displayed. When to charge can also be confusing-various engagement outcomes (or lack thereof) may arise across EV makes.

Accordingly, illustrative embodiments of the present disclosure observe behavioral preferences from a vehicle's eye-tracking tech, interactions from touchscreens, driver settings, and vehicle charging activity, which assists vehicle manufacturers design better actionable interfaces for customers. The disclosed systems perform this user feedback loop in real-time to make updates over-the-air ("OTA") readily available to vehicles on the network, rather than wait for the next model year's refresh for continuous improvement.

The illustrative systems described herein may be implemented as a process at least partially implemented on an in-cabin display, and operated by a control process executing on a local or remote processor that accepts user interaction inputs from a suitable user-interface and other control devices, and that is in communication with one or more user interaction mechanisms and sensors. In that regard, the control process performs certain specific operations in response to different inputs or selections made at different times, and/or in response to real-time or near-real-time data received from interaction mechanisms or sensor readings.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes, and should not be considered to limit the scope of the vehicle system described herein. Certain features may be added, removed, or modified without departing from the spirit of the claimed subject matter.

FIG. 1 is a diagrammatic illustration of a system to determine preferred information communication variants in accordance with at least one embodiment of the present disclosure. In an example, a system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115c.

A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include arrangement of communication variants, location, mapping, route or path, and topography information.

An operational equipment engine 140 is operably coupled to, and adapted to be in communication with, the vehicle control unit 110 and information communication module 142 which are utilized to perform the methods described herein. A sensor engine 150 is operably coupled to, and adapted to be in communication with, the vehicle control unit 110. The sensor engine 150 is adapted to monitor various components of, for example, the operational equipment engine 140 and one or more cameras in/on the vehicle (not shown), motion sensors, etc. as will be described in further detail below.

An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the vehicle system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor 195 and drivetrain 200, and sensor engine 150.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Figure 2:
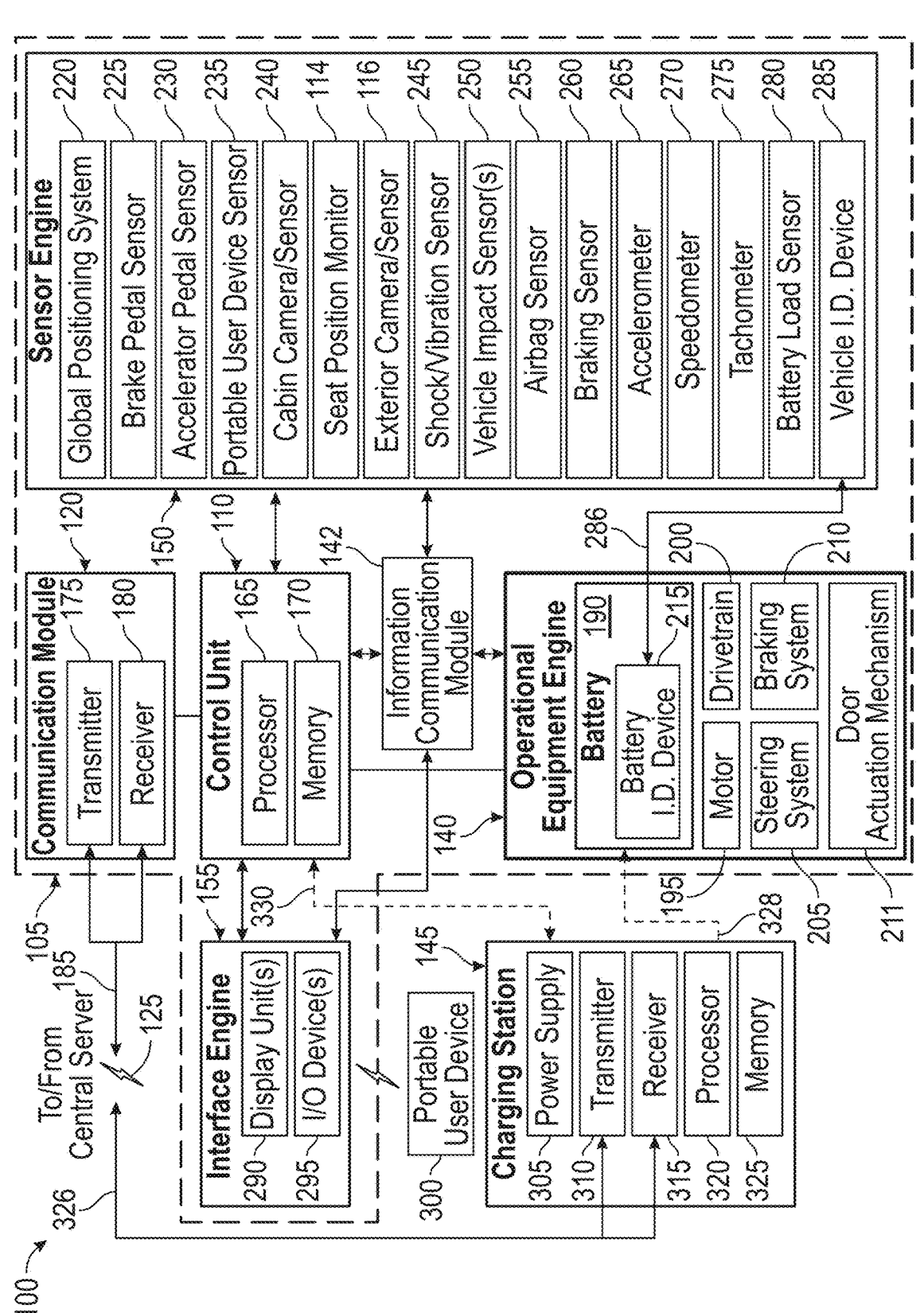
FIG. 2 is a diagrammatic illustration, in a block-diagram form, of at least a portion of the system of FIG. 1, in accordance with at least one embodiment of the present disclosure.

FIG. 2 is a diagrammatic illustration, in a block-diagram form, of at least a portion of the vehicle system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, a braking system 210, and one or more door actuation mechanism(s) 211. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215.

The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like. In some embodiments, the motor is an internal combustion motor and the battery operates a starter.

In some examples, the sensor engine 150, which is operably coupled to, and adapted to be in communication with, the vehicle control unit 110, includes devices such as sensors, cameras, meters, detectors, or other devices configured to measure or sense a parameter related to a driving operation of the vehicle 105 or the position of a user entering or exiting vehicle 105. For example, the sensor engine 150 may include a global positioning system 220 that can be used to determine road grade, a brake pedal sensor 225, an accelerator pedal sensor 230, a portable user device sensor 235 that can be used to determine when a certain driver or user is in the vicinity or inside vehicle 105, a cabin camera/sensor 240 used to monitor a person's eye movement, motion or their position within vehicle 105, a seat position monitor 114 used to control and monitor the position of the vehicle seats, a shock/vibration sensor 245, a vehicle impact sensor 250, an airbag sensor 255, a braking sensor 260, an accelerometer 265 (which may in some cases also serve as an inclinometer), a speedometer 270, a tachometer 275, a battery load sensor 280, a vehicle identification device 285, one or more exterior cameras or sensors 116 that can be used to monitor traffic and/or weather conditions around the vehicle or to determine when vehicle 105 approaches a parking space, or any combinations thereof. In some instances, traffic or weather patterns may be monitored from outside the vehicle and received from a server via a network.

Further, the sensors or other detection devices 116 may be configured to sense or detect activity, conditions, and circumstances in an area to which the device has access, e.g., ambient conditions, conditions within the vehicle cabin, etc. Sub-components of the sensor engine 150 may be deployed at any operational area where information on the driving of the vehicle 105 may occur. Some readings from the sensor engine 150 may be fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265, and may also serve as an inclinometer or tilt sensor. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system (user interaction mechanism) that enables a user to interact with the vehicle control unit 110, information communication module 142, and the functions that the vehicle control unit 110 provides. Thus, in certain embodiments, the user's interactions with in-cabin displays are captured by interface engine 155 and analyzed by information communication module 142 (or some remote module) to determine preferred information communication variants to be displayed or otherwise communication to the user's within the vehicle cabin.

The differing information communication variants displayed or otherwise communicated to in-cabin occupants may take a variety of forms. First, those differing information communication variants are generated using an A/B testing methodology. Then, the generated communication variants are transmitted to the vehicles over network 130. The communication variants may be different arrangements, themes, sensory outputs, or display positions of icons on in-cabin displays (or other user interaction mechanisms). The in-cabin displays may be displayed in a HUD unit, a dashboard display, or other display positioned virtually anywhere inside the cabin. The communication variants may also be communicated to the in-cabin occupants via sensory input/output mechanism that allow audible, haptic, light, etc. communication with in-cabin occupants. Ultimately, the system 100 will analyze which information communication variants are most effective/preferred in obtaining positive user interaction/conduct/feedback.

Interface engine 155 may communicate with in-cabin occupants via a variety of display unit(s) 290 or I/O devices 295, also referred to as user interaction mechanisms. For example, the user interaction mechanisms can be a vehicle eye-tracking mechanism, motion capture mechanism, microphone, display buttons, touchscreen or setting mechanism in the vehicle cabin. Examples of setting mechanisms can include air-conditioning settings, seat settings, volume settings and the like. Further, the user interaction mechanism can also be any interface which allows the user to communicate his or her intention with respect to vehicle charging activity. For example, an in-cabin display may prompt the user that the vehicle needs charging soon and ask if the user will charge soon (or otherwise solicit a response from the user). In response, the user could affirm his/her intention to charge/not charge the vehicle via a touch screen, sensory input or some other interaction mechanism. For example, touchscreen interactions would provide usability/behavioral tracking from the driver's interaction with the touchscreens. This data is saved locally or uploaded to the cloud and, thereafter, used to determine preferred or most effective communication variants (e.g., display locations in the vehicles, icon placement/size, etc.).

As previously mentioned, in some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, key fobs, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

Further, control unit 110 is communicably coupled to a charging station 145 via communication link 330 to charge the vehicle battery 190, in the event of a hybrid or EV. Charging station 145 is communicably coupled to operational equipment engine 140 via a communication link 328. The charging station 145 may be any suitable charging station having a power supply 305, transmitter 310, receiver 315, processor 320 and memory 325 to perform the necessary charging and communication processes. Charging station 145 communicates with the central server via communication link 326.

A reader of ordinary skill in the art will understand that other components or arrangements of components may be found in a vehicle 105, and that may of the same general principles apply to electric vehicles, internal combustion vehicles, and hybrid vehicles.

Figure 3:
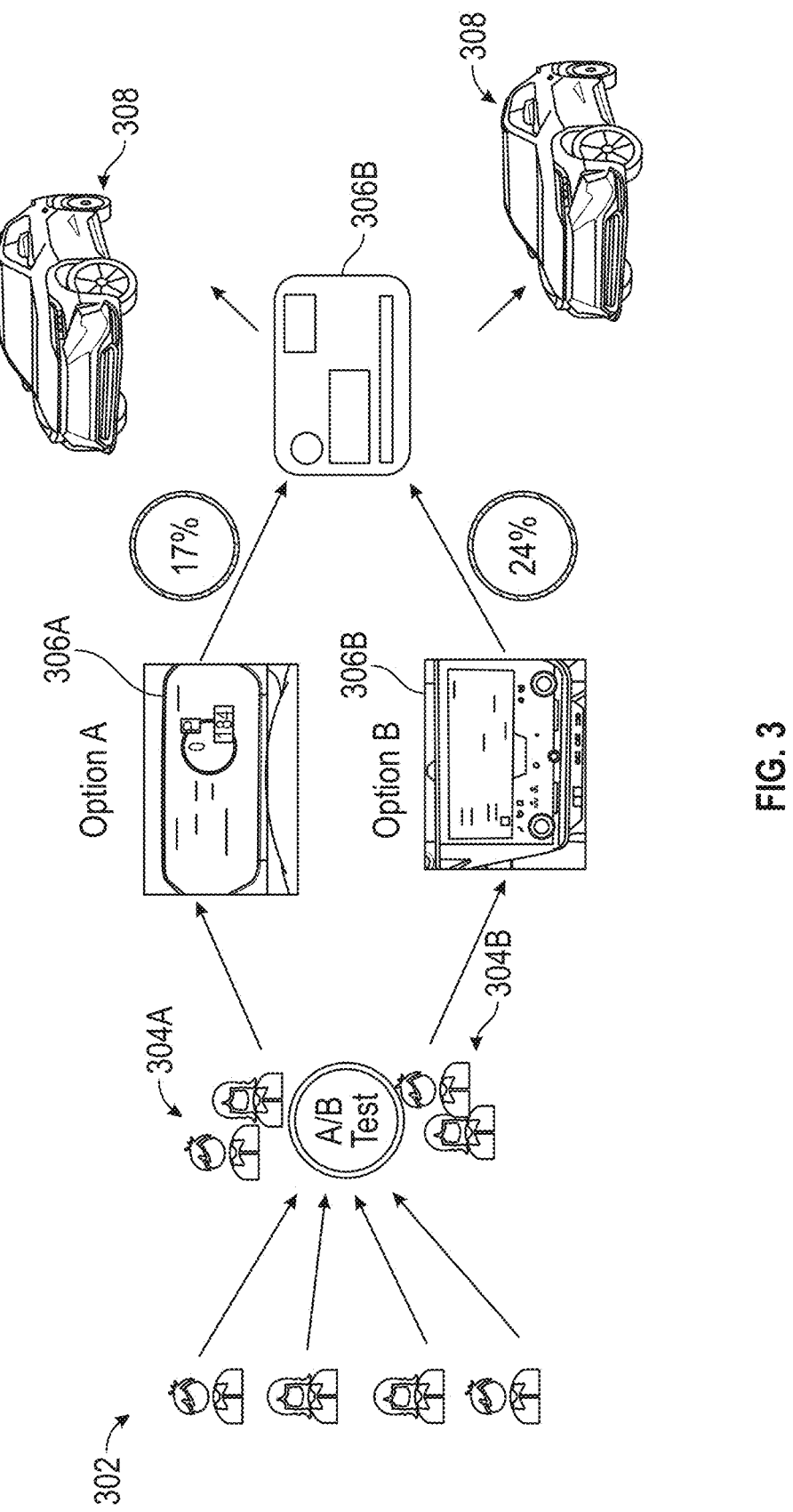
FIG. 3 is a general representation of a process flow in accordance with at least one embodiment of the present disclosure.

FIG. 3 is an illustration of the general process for determining preferred information communication variants, according to certain illustrative embodiments of the present disclosure. As show, a plurality of users or drivers 302 are positioned inside a plurality of vehicles on the network. A plurality of information communication variants are presented to those users 302 via some user interface mechanism inside the vehicles. In this example, the interface mechanism is a touchscreen display. One information communication variant is used on the touchscreen display 306A transmitted to a group of users 304A, while another different information communication variant is used on the touchscreen display 306B which is transmitted to a group of users 304B. Note, any number of communication variants can be tested. In this example, users 304A and 304B are randomized diverse groups of users. In this test, the information communication variants are being used to determine the most effective variant to elicit the user to charge the vehicle.

Still referencing FIG. 3, in this example, touchscreen display 306A is located in the center console of the vehicle, while touchscreen display 306B is located within the HUD of the vehicle (here, the location is the information communication variant). As we can see, touchscreen 306B receives a 24% engagement rate, while touchscreen 306A receives a 17% engagement rate. For example, the rate of engagement may be determined by the number of times a user affirmatively responds to an alert the vehicle needs to be charged (e.g., by touching the screen to indicate the user intends to charge the vehicle, audibly responding to the prompt or some other multi-sensory response, etc.). Other communication variants may also be used/tested such as, for example, the size, color or location of the menus, fonts, icons on the display, the arrangement of such icons, sensory alerts, etc. Other communication variants can include where/how vehicle information and charging activity are displayed or stored. Accordingly, touchscreen variant 306B is selected and then saved locally or uploaded to the cloud where they may be further analyzed to determine preferred information communication variants. Thereafter, in real-time, the system can transmit the preferred information communication variant updates to vehicles 308 on the network. Such updates can be transmitted to the target vehicles over-the-air in real time. The updates may be sent to a defined vehicle segment (e.g., SUVs) or to different vehicle segments.

Further, in alternative embodiments, in the example above some of the users may alter the arrangement, position, etc of touchscreen variants 306A or 306B. Such alterations may take a variety of forms such as, for example, resizing, moving, tapping, toggling or other alterations. In such cases, using the A/B testing methodology, if enough users also make these same alterations to variants 306A or 306B, the system records this data and may use it as a preferred information communication variant or for further testing. Here, the system will compile variations of each variant to determine the most desired/effective variant, which is then used in the subsequent update. Further, the information may also be segmented into vehicle type (SUV, truck, small SUV, etc) such that certain information communication variants are preferred for certain vehicle types, while others are not.

The information communication variants may be curated to any automaker's specifications and per any safety regulations, as necessary. Any adjustments of lights and sounds are also curated to the automaker's specifications and per safety regulations. Such curated user interfaces may be vetted with human-centered design principles (e.g., when the in-cabin user interaction data is analyzed).

In yet further embodiments, the user interaction data can relate to charging history, EV route planning, public charger recommendations (e.g., based on reliability), range information, range improvement recommendations and state of charge (SOC). For example, how/when the user reacts to prompts related to charging history, route planning, charger recommendations, range information, range improvement recommendations and SOC can also be used to determine the preferred information communication variants. Further, for drivers who charge their EV daily, the recommendations and notifications would be minimal or non-existent (because they don't need reminding). Compare this to drivers who wait until the state-of-charge is at a low percentage when things like battery health and range get risky and dangerously low to get to their destination. For the latter case, their notifications would be tailored and personalized (visually different with sensory outputs like lights or sounds, or other combinations) in such a way that causes the user to take the appropriate action. If it's the usual notifications or alerts (e.g., alerts on a smartphone or sounds from an alarm clock), there is a high chance the user will become desensitized to it over time. Thus, certain illustrative embodiments of the present disclosure provide a variety of personalized sensory outputs delivered smartly and timely to solicit a positive response from the user.

Figure 4A:
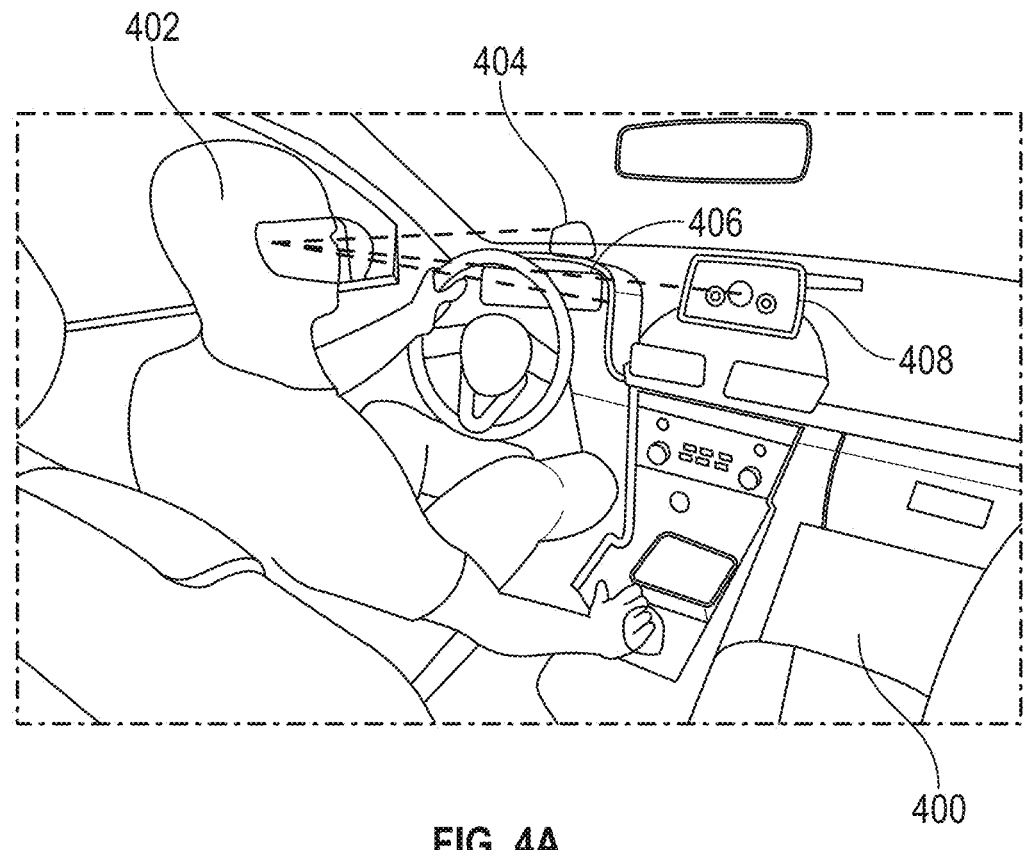
FIGS. 4A and 4B are in-cabin perspective views, according to certain illustrative embodiments of the present disclosure.

FIG. 4A is a perspective view inside a vehicle cabin. Vehicle cabin 400 shows a driver 402 which has access to a HUD 404, a steering wheel dash display 406 and a center console touchscreen 408. Although not shown, a driver eye monitor camera is also positioned in or around dash display 406 to track eye movement of the driver. The eye tracking data is further used by the system to determine interface engagement and the most effective information communication variants.

Figure 4B:
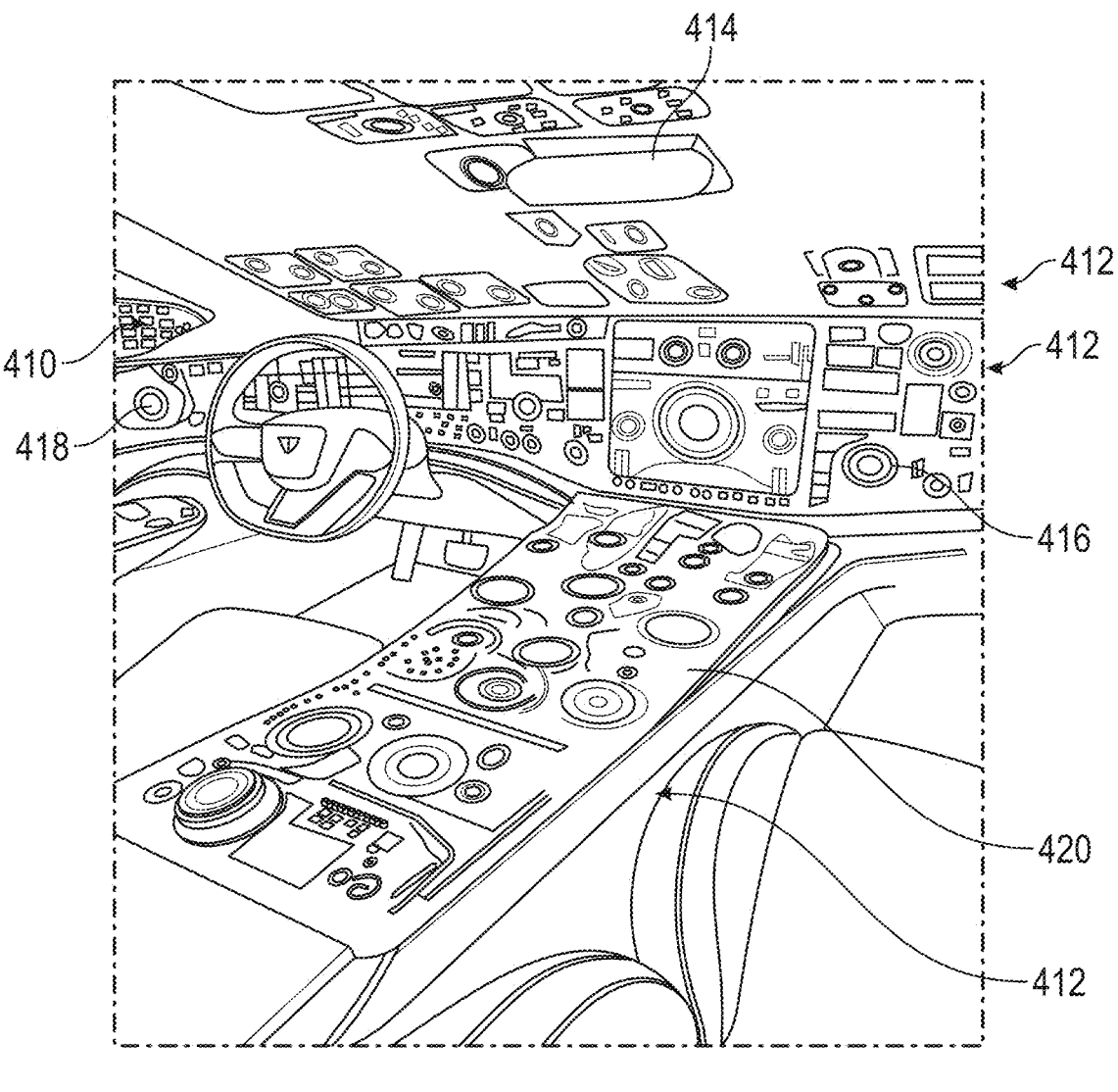

FIG. 4B is another perspective view inside another vehicle cabin. Vehicle cabin 410 shows a variety of differing information communication variants used on a variety of user interface mechanisms 412. Here, as can be seen, various user interface mechanisms 412 are positioned on the windshield 414, front console 416, side door 418 and center console 420. The user interface mechanisms here are shown as touchscreen displays, HUDs on the driver and passenger side windshield 414, haptic/sensory interface mechanisms, etc.

Figure 5:
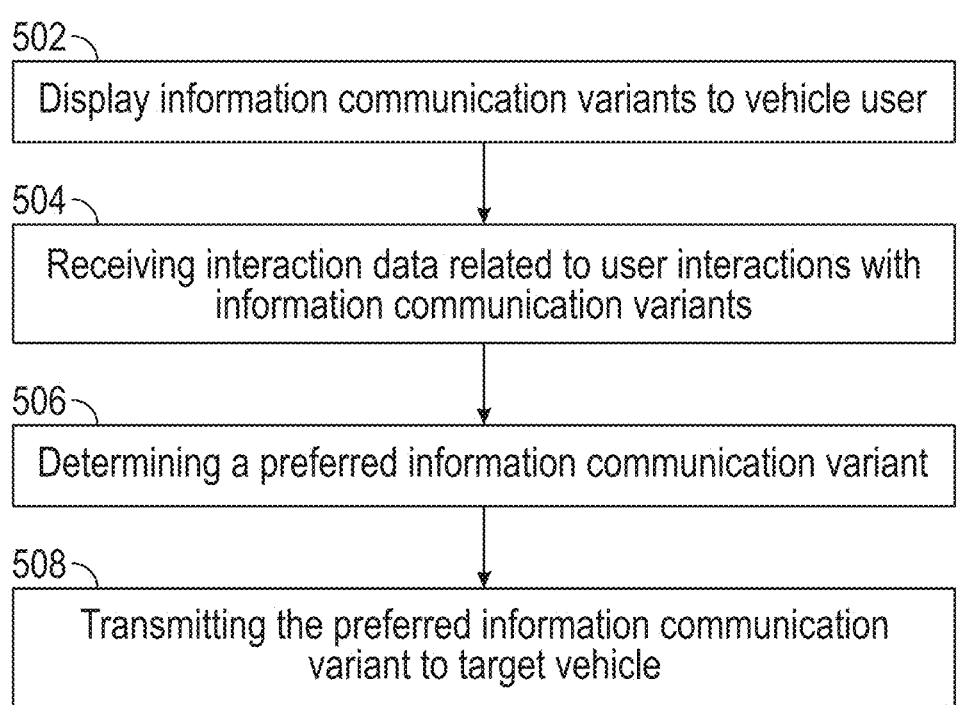
FIG. 5 is a flow chart for a method to determine preferred information communication variants, according to illustrative embodiments of the present disclosure.

FIG. 5 is a flow chart of a method to determine preferred information communication variant, according to certain illustrative embodiments of the present disclosure. In this example, the vehicle includes one or more user interaction mechanisms positioned in a vehicle cabin, as described herein. A processing system, such as control unit 110 and information communication module 142, are communicably coupled to the user interaction mechanisms. In method 500, system 100 causes a plurality of information communication variants to be transmitted and displayed to users within a plurality of vehicles, at block 502. The users within the vehicles then interact with the information communication variants via the user interaction mechanisms, to thereby generate user interaction data. At block 504, the system transmits the user interaction data over the network to the cloud, for example, where it is stored. At block 506, the system then determines a preferred information communication variant via a variety of analyzes techniques. Thereafter, at block 508, the system transmits the preferred information communication variant to target vehicles on the network. Such transmissions can be in real-time over-the-air.

It is noted that flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, in order to determine preferred information communication variants in real time, the system 100 may need to execute multiple times per second (e.g., a rate of 10 Hz, 20 Hz, etc.).

Accordingly, the described system provide a number of advantages. First, in certain embodiments, at least two curated variants (themes, backgrounds, sensory output) can be chosen to be displayed/configured in the vehicle's cabin. Font size, lights/chimes, charging recommendations, range improvement recommendations, and display time/visibility can be adjusted and moved per user's preferences. For instance, range and charging information placements can be moved to some areas of screens (e.g., multi-media, instrument cluster, HUD). However, limitations will be placed if it compromises visibility or safety.

Second, in certain embodiments, customizable preferences (e.g., improved readability and usability to reduce range anxiety) are securely collected in real time. No personal identifiable information (PII) is collected or stored.

Third, in certain illustrative embodiments, feature planning becomes more like "feature voting" by the customer via cockpit customization/selection and can help determine overall popularity by segment. These preferred variants are optimal to, for example, display range and other charging needs for the overall customer base to select from in the next software update.

Lastly, in certain illustrative embodiments, data is anonymously collected in the aggregate for added privacy to bring to light interfaces that users choose to use the most. The latest versions will be readily available in the next software update, resulting in faster continuous improvement for users-which can be continuously updated in real-time.

Figure 6:
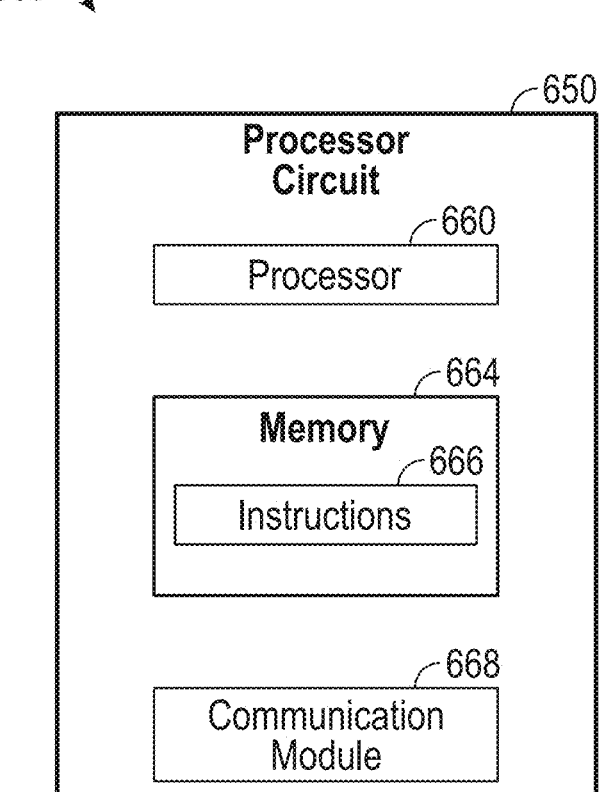
FIG. 6 is a schematic diagram of a processor circuit 650, in accordance with at least one embodiment of the present disclosure.

FIG. 6 is a schematic diagram of a processor circuit 650, in accordance with at least one embodiment of the present disclosure. The processor circuit 650 may be implemented in the system 100, or other devices or workstations (e.g., third-party workstations, network routers, etc.), or on a cloud processor or other remote processing unit, as necessary to implement the methods described herein. As shown, the processor circuit 650 may include a processor 660, a memory 664 having instructions 666 thereon, and a communication module 668. These elements may be in direct or indirect communication with each other, for example via one or more buses.

The processor 660 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 660 may also comprise another hardware device, a firmware device, or any combination thereof configured to perform the operations described herein. The processor 660 may also be implemented as a combination of computing devices, e.g., a combination of a DSP and a microprocessor, a plurality of microprocessors, one or more microprocessors in conjunction with a DSP core, or any other such configuration.

The memory 664 may include a cache memory (e.g., a cache memory of the processor 660), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 664 includes a non-transitory computer-readable medium. The memory 664 may store instructions 666. The instructions 666 may include instructions that, when executed by the processor 560, cause the processor 660 to perform the operations described herein. Instructions 666 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 568 can include any electronic circuitry and/or logic circuitry to facilitate direct or indirect communication of data between the processor circuit 650, and other processors or devices. In that regard, the communication module 668 can be an input/output (I/O) device. In some instances, the communication module 668 facilitates direct or indirect communication between various elements of the processor circuit 650 and/or the system 100. The communication module 668 may communicate within the processor circuit 650 through numerous methods or protocols. Serial communication protocols may include but are not limited to United States Serial Protocol Interface (US SPI), Inter-Integrated Circuit (I2C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or readings from vehicle or environmental sensors) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

The technology described herein may be implemented on manually controlled vehicles or driver-assist vehicles. The technology may be implemented in diverse combinations of hardware, software, and firmware, depending on the implementation or as necessitated by the structures and modules already present in existing vehicles. The system may be employed on vehicles, for example, with automatic transmission, manual transmissions, or vehicles with simulated shifting, including continuously variable transmission (CVT), infinitely variable transmission (IVT), hybrid transmissions (e.g., a hybrid vehicle with 4-speed automatic transmission simulating 10 gears), fully electric vehicles or plug-in hybrids.

Accordingly, the logical operations making up the embodiments of the technology described herein may be referred to variously as operations, steps, blocks, objects, elements, components, or modules. Furthermore, it should be understood that these may occur or be arranged in any order, unless explicitly claimed otherwise or a specific order is necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the cargo seat adjustment system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the vehicle door activating system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system to determine preferred information communication variants in vehicles, the system comprising:
    one or more user interaction mechanisms positioned in a plurality of vehicles; and
    a processor communicably coupled to the user interaction mechanisms, the processor having a memory and configured to perform operations comprising:
        generating, using an A/B testing methodology, a first information communication variant and second information communication variant to be tested on a plurality of users inside a plurality of vehicles on a communications network;
        causing the first information communication variant to be communicated to a first group of users, the first information communication variant being displayed to the first group of users within a first group of vehicles;
        causing the second information communication variant to be communicated to a second group of users different from the first group of users, the second information communication variant being displayed to the second group of users within a second group of vehicles;
        receiving, via the one or more user interaction mechanisms inside the first and second group of vehicles, interaction data related to user interactions with the first and second information communication variants;
        determining, based on the interaction data, a preferred information communication variant between the first and second information communication variants; and
        causing the preferred information communication variant to be transmitted to one or more target vehicles in response to determining the preferred information communication variant.

2. The system of claim 1, wherein the first and second group of users are randomly selected.

3. The system of claim 1, wherein the one or more user interaction mechanisms comprise at least one of:
    a vehicle eye-tracking mechanism;
    a motion capture mechanism inside the vehicle;
    a vehicle microphone;
    a vehicle touchscreen; or
    a vehicle setting mechanism.

4. The system of claim 1, wherein the preferred information communication variant is transmitted to the one or more target vehicles over-the-air in real-time.

5. The system of claim 1, wherein the first and second information communication variants are:
    different arrangements or themes of vehicle in-cabin displays; or
    different sensory outputs inside the vehicle.

6. The system of claim 1, wherein the interaction data is:
    data related to alterations of the first or second communication variants initiated by the first or second group of users; or
    eye tracking data of the first or second group of users obtained via an eye tracking mechanism.

7. The system of claim 1, wherein the one or more user interaction mechanisms is a user interface intended to communicate a user's intention with respect to vehicle charging activity.

8. A computer-implemented method to determine preferred information communication variants in vehicles, the method comprising:
    generating, using an A/B testing methodology, a first information communication variant and second information communication variant to be tested on a plurality of users inside a plurality of vehicles on a communications network;
    causing the first information communication variant to be communicated to a first group of users, the first information communication variant being displayed to the first group of users within a first group of vehicles;
    causing the second information communication variant to be communicated to a second group of users different from the first group of users, the second information communication variant being displayed to the second group of users within a second group of vehicles;

receiving, via the one or more user interaction mechanisms inside the first and second group of vehicles, interaction data related to user interactions with the first and second information communication variants;

determining, based on the interaction data, a preferred information communication variant between the first and second information communication variants; and causing the preferred information communication variant to be transmitted to one or more target vehicles in response to determining the preferred information communication variant.

9. The computer-implemented method of claim 8, wherein the first and second group of users are randomly selected.

10. The computer-implemented method of claim 8, wherein the one or more user interaction mechanisms comprise at least one of:

a vehicle eye-tracking mechanism;

a motion capture mechanism inside the vehicle;

a vehicle microphone;

a vehicle touchscreen; or a vehicle setting mechanism.

11. The computer-implemented method of claim 8, wherein the preferred information communication variant is transmitted to the one or more target vehicles over-the-air in real-time.

12. The computer-implemented method of claim 8, wherein the first and second information communication variants are;

different arrangements or themes of vehicle in-cabin displays; or different sensory outputs inside the vehicle.

13. The computer-implemented method of claim 8, wherein the interaction data is:

data related to alterations of the first or second communication variants initiated by the first or second group of users; or eye tracking data of the first or second group of users obtained via an eye tracking mechanism.

14. The computer-implemented method of claim 8, wherein the one or more user interaction mechanisms is a user interface intended to communicate a user's intention with respect to vehicle charging activity.

15. A computer-implemented method for determining preferred information communication variants in vehicles, the method comprising:

generating, using an A/B testing methodology, a first information communication variant and second information communication variant to be tested on a plurality of users inside a plurality of vehicles on a communications network;

causing the first information communication variant to be communicated to a first group of users, the first information communication variant being displayed to the first group of users within a first group of vehicles;

causing the second information communication variant to be communicated to a second group of users different from the first group of users, the second information communication variant being displayed to the second group of users within a second group of vehicles;

receiving interaction data related to user interactions with the first and second information communication variants; and determining a preferred information communication variant between the first and second information communication variants.

16. The computer-implemented method of claim 15, wherein the preferred information communication variant is transmitted to one or more target vehicles.

17. The computer-implemented method of claim 15, wherein the wherein the first and second group of users are randomly selected.

18. The computer-implemented method of claim 15, wherein the first and second information communication variants:

are different arrangements or themes of vehicle in-cabin displays; or different sensory outputs inside the vehicle.

19. The computer-implemented method of claim 15, wherein the interaction data is received via a user interaction mechanism intended to communicate a user's intention with respect to vehicle charging activity.

20. The computer-implemented method of claim 15, wherein the interaction data relates to charging history, Electric Vehicle route planning, public charger recommendations, range information, range improvement recommendations and state of charge.

* * * * *